United States Patent [19]
Weder et al.

[11] Patent Number: 5,221,248
[45] Date of Patent: Jun. 22, 1993

[54] FLOWER POT OR FLOWER POT COVER WITH FINS

[75] Inventors: Donald E. Weder; Joseph G. Strater, both of Highland, Ill.

[73] Assignee: Highland Supply Corporation, Highland, Ill.

[21] Appl. No.: 805,419

[22] Filed: Dec. 10, 1991

Related U.S. Application Data

[63] Continuation-in-part of Ser. No. 422,653, Oct. 17, 1989, Pat. No. 5,073,161, which is a continuation-in-part of Ser. No. 397,114, Aug. 22, 1989, Pat. No. 5,029,412, which is a continuation-in-part of Ser. No. 366,588, Jun. 15, 1989, Pat. No. 5,111,613, which is a continuation-in-part of Ser. No. 219,083, Jul. 13, 1988, Pat. No. 4,897,031, which is a continuation-in-part of Ser. No. 4,273, Jan. 5, 1987, Pat. No. 4,773,182, which is a continuation of Ser. No. 613,080, May 22, 1984, abandoned, which is a continuation-in-part of Ser. No. 367,098, Jun. 15, 1989, Pat. No. Des. 318,030, which is a continuation-in-part of Ser. No. 283,014, Dec. 8, 1988, abandoned, which is a continuation of Ser. No. 652,903, Sep. 21, 1984, abandoned, which is a continuation-in-part of Ser. No. 613,053, May 22, 1984, Pat. No. Des. 293,224, which is a continuation-in-part of Ser. No. 710,722, Jun. 4, 1991, which is a continuation-in-part of Ser. No. 617,454, Nov. 21, 1990, abandoned, which is a continuation-in-part of Ser. No. 411,249, Sep. 22, 1989, which is a continuation-in-part of Ser. No. 411,247, Sep. 22, 1989, which is a continuation-in-part of Ser. No. 411,245, Sep. 22, 1989.

[51] Int. Cl.$^5$ ............................................. B31B 1/46
[52] U.S. Cl. .................................. 493/133; 425/388; 425/387.1; 493/154; 493/167; 493/170; 493/171; 493/901
[58] Field of Search ............... 493/133, 134, 154, 167, 493/168, 170, 171, 174, 901; 425/387.1, 388, 330; 264/554

[56] References Cited

U.S. PATENT DOCUMENTS

| | | | |
|---|---|---|---|
| 735,729 | 8/1903 | Dowling | 493/171 |
| 1,124,618 | 1/1915 | House | 493/154 |
| 1,645,931 | 10/1927 | Ruckert | 493/167 |
| 2,959,110 | 11/1960 | Thoma | 493/154 |
| 3,007,377 | 11/1961 | Muller | 493/154 |

Primary Examiner—Bruce M. Kisliuk
Assistant Examiner—Jack Lavinder
Attorney, Agent, or Firm—Dunlap, Codding & Lee

[57] ABSTRACT

An apparatus and method for forming a sheet of material into a flower pot or flower pot cover with fins. The apparatus comprises a male mold, a female mold having an opening mating with the male mold, and means for moving the male mold into and out of the opening of the female mold with the sheet of material between the two molds. To form outwardly extending fins in the flower pot cover, fingers are extended from the male mold to push folds in the sheet of material between segments of the female mold. The female segments are closed on the folds to form fins in the sheet of material as the male mold is pressed into the female mold to make the flower pot cover. To form inwardly extending fins, fingers are moved between the female segments to push folds in the sheet of material between segments of the male mold. The segments of the male mold close on the folds to form fins in the sheet of the material as the male mold is pressed into the female mold to make the flower pot cover.

18 Claims, 11 Drawing Sheets

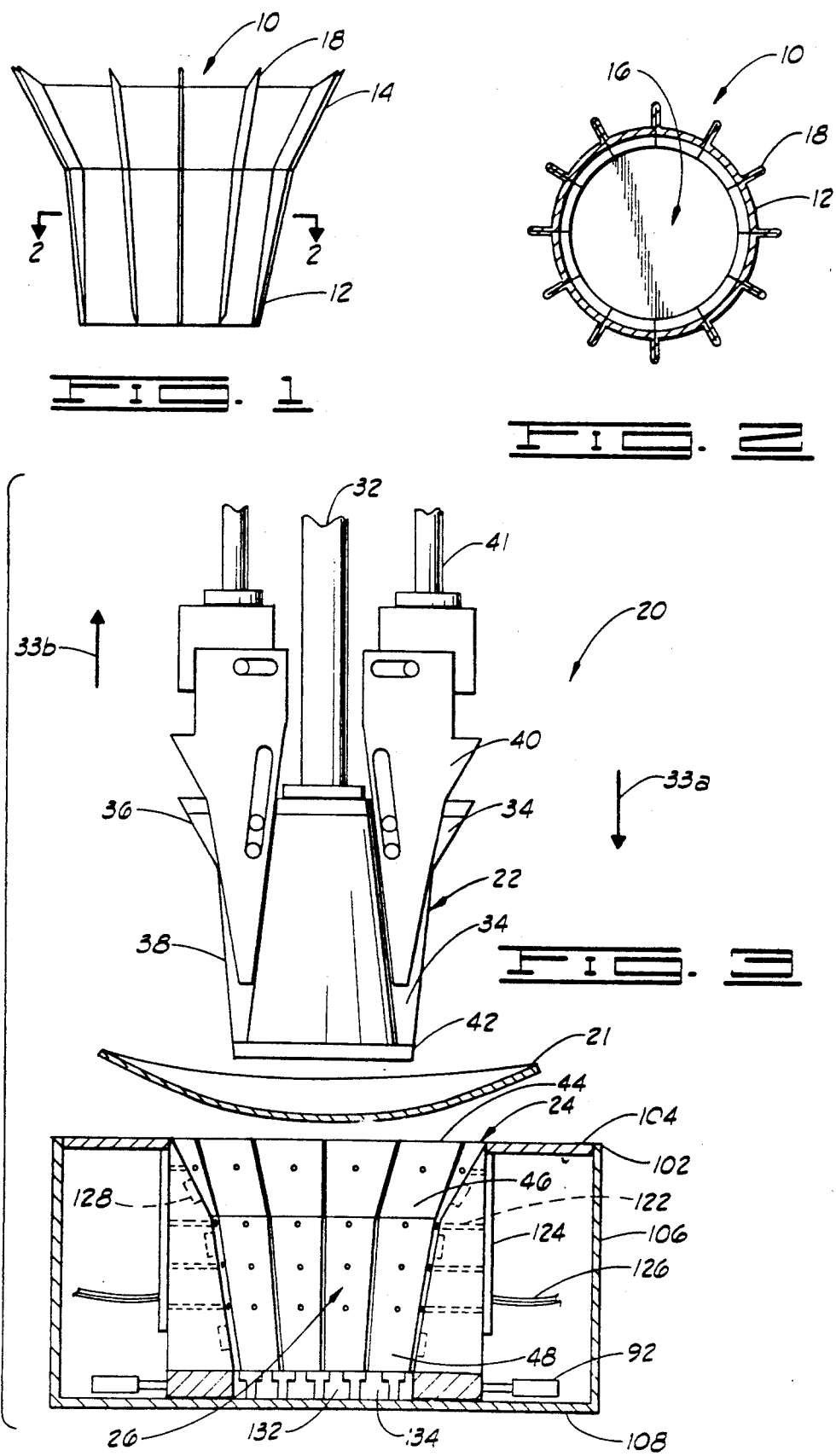

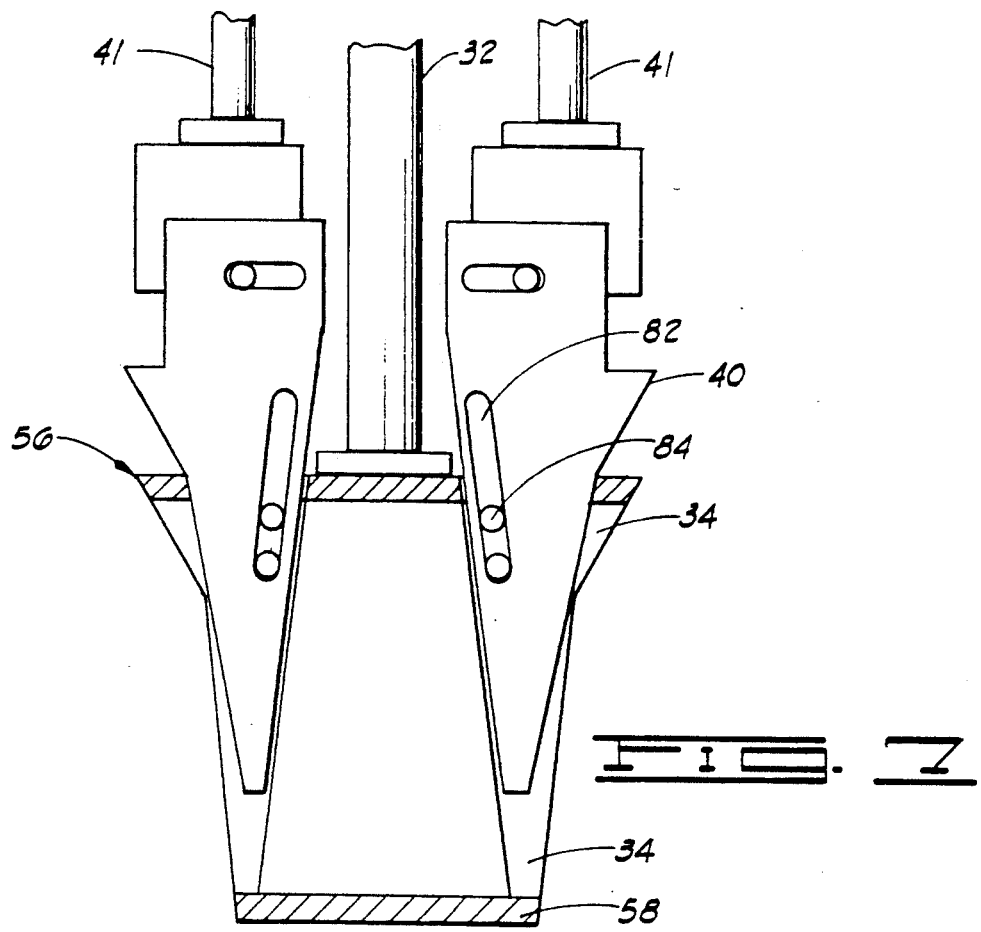
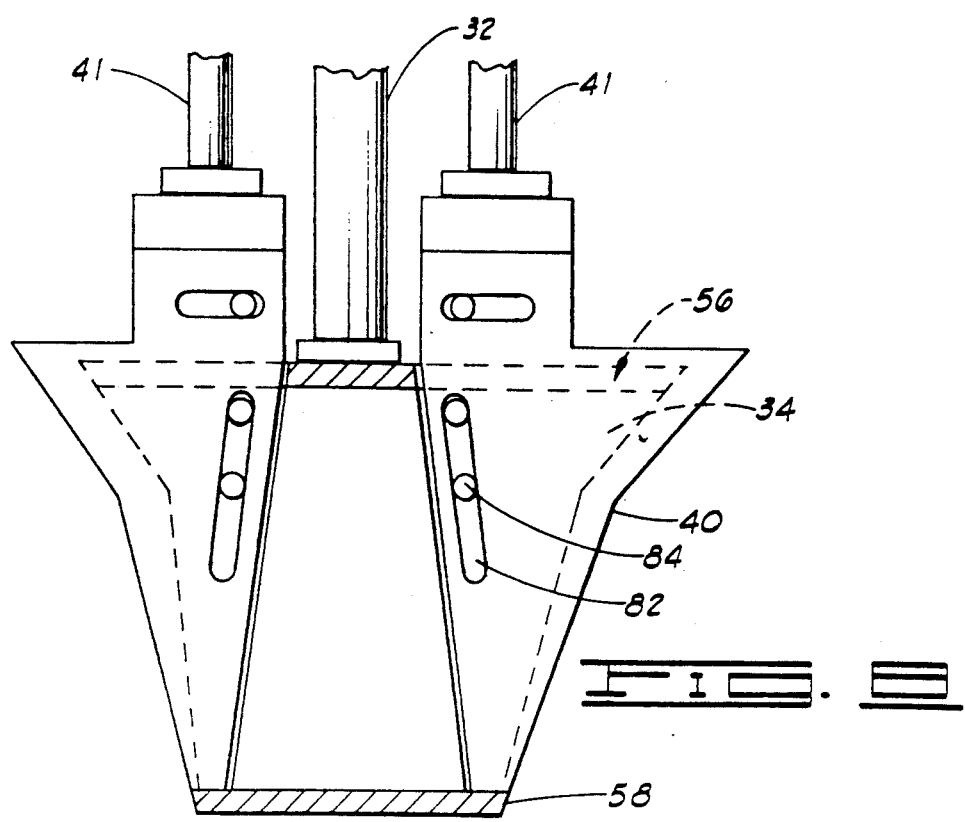

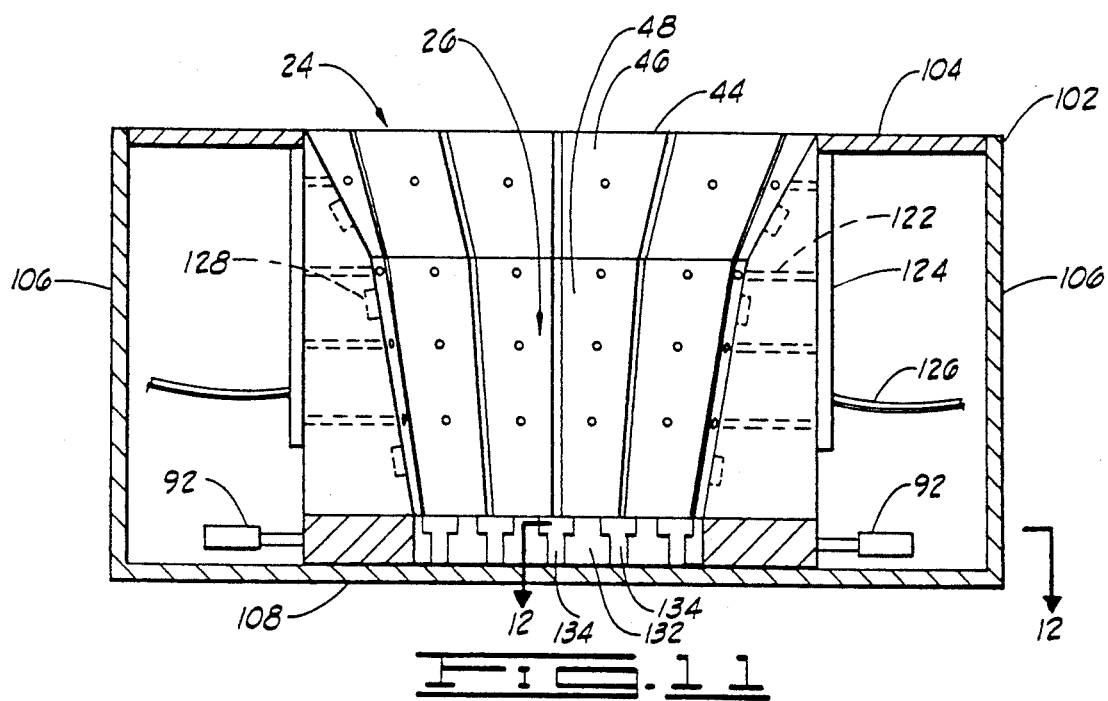
FIG. 11
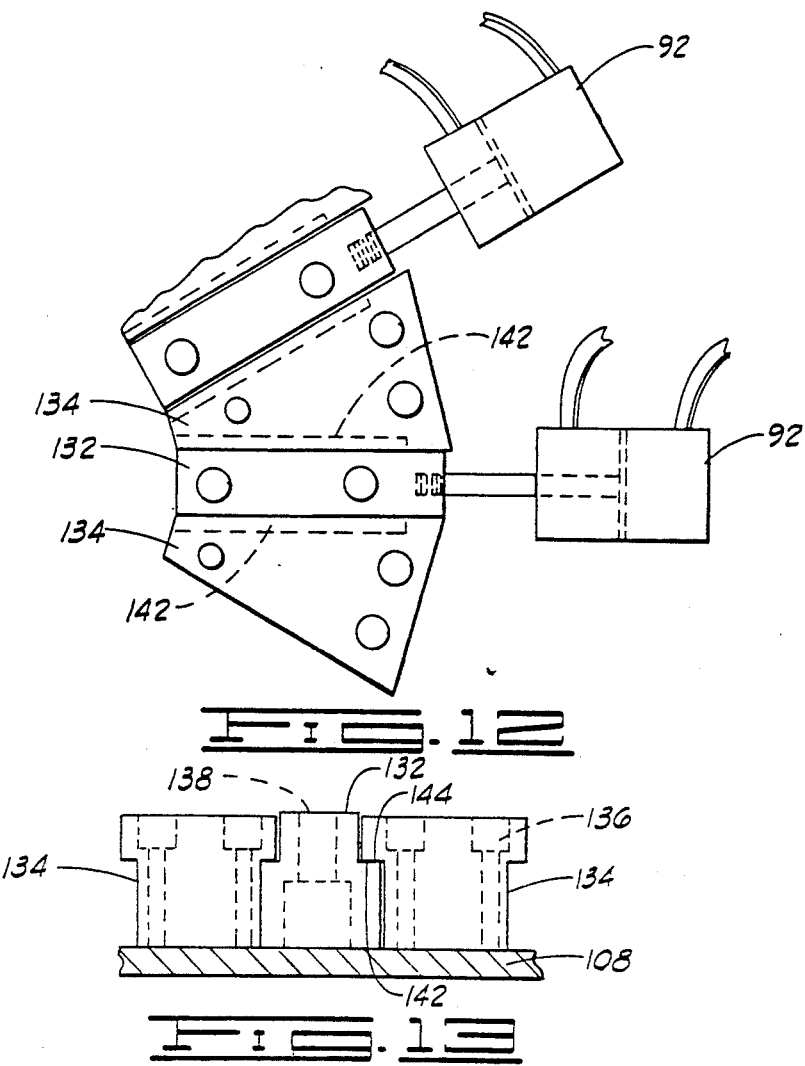
FIG. 12
FIG. 13

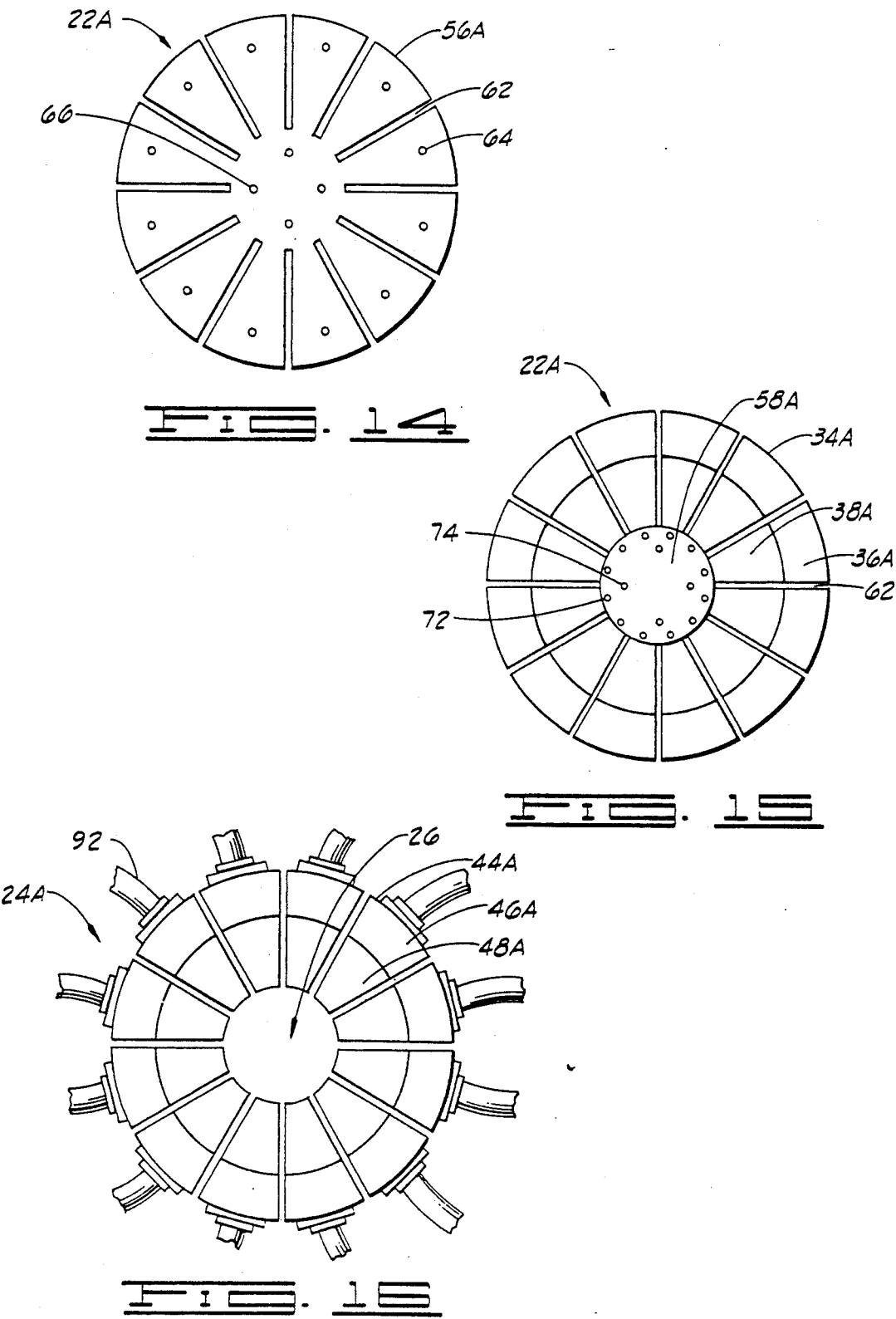

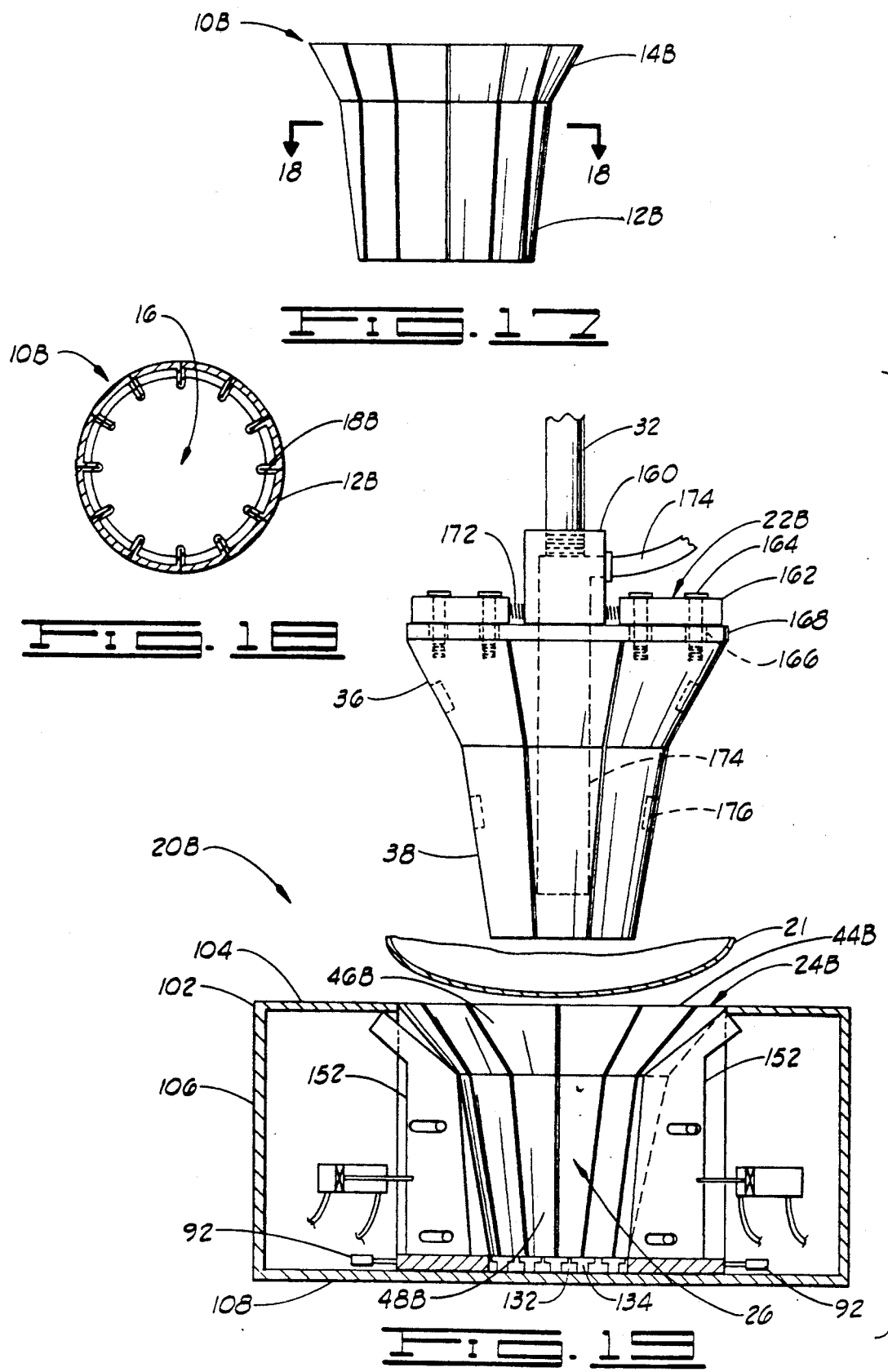

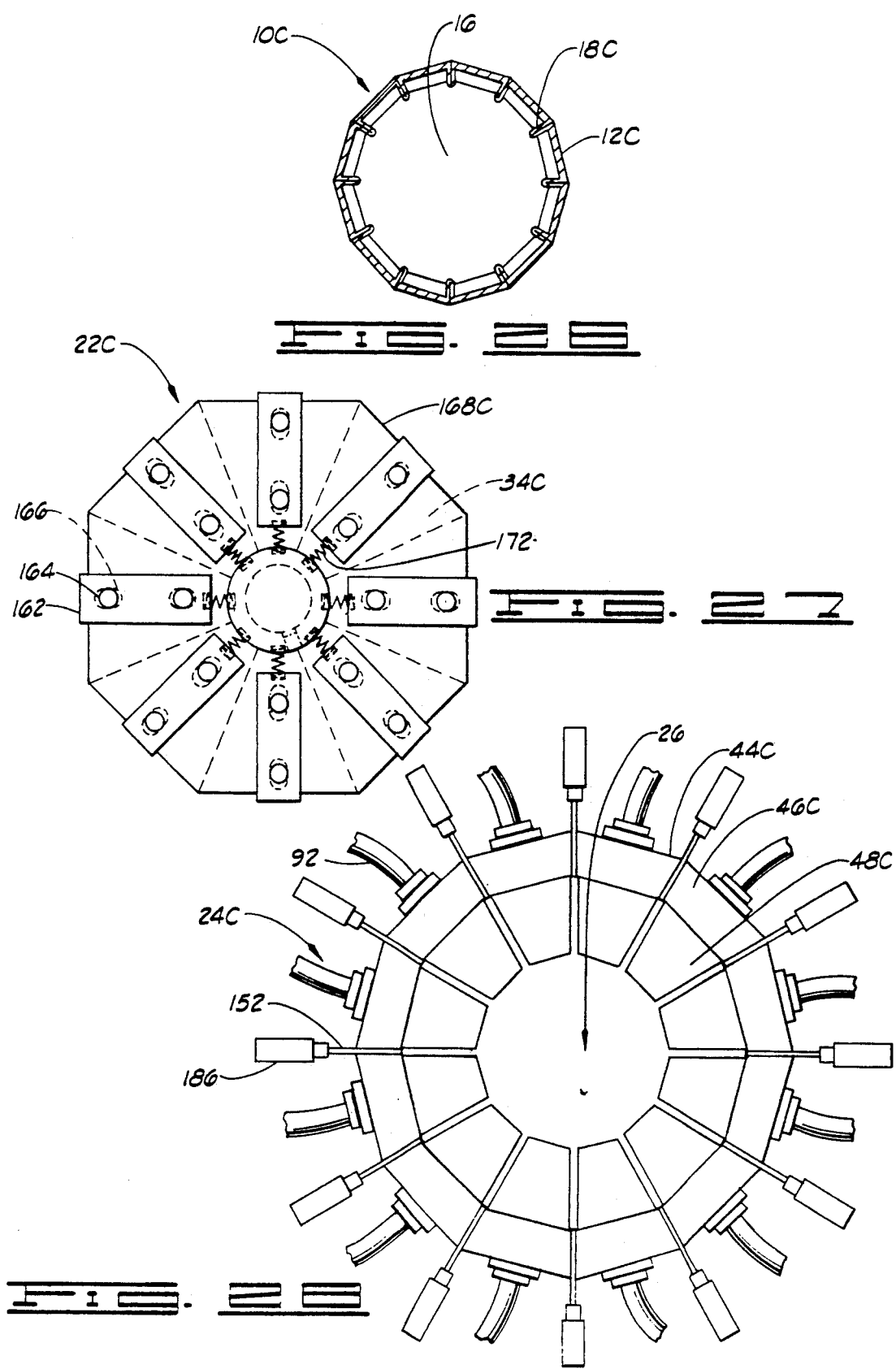

FLOWER POT OR FLOWER POT COVER WITH FINS

CROSS-REFERENCE TO RELATED APPLICATIONS

This application is a continuation-in-part U.S. Ser. No. 422,653 filed Oct. 17, 1989, entitled "FLOWER POT OR FLOWER POT COVER WITH CONTROLLED PLEATS;" now U.S. Pat. No. 5,073,161; which is a continuation-in-part of U.S. Ser. No. 397,114, filed Aug. 22, 1989, issued as U.S. Pat. No. 5,029,412 on Jul. 9, 1991; which is a continuation-in-part of U.S. Ser. No. 366,588, filed Jun. 15, 1989 now U.S. Pat. No. 5,111,613; which is a continuation-in-part of U.S. Ser. No. 219,083, filed Jul. 13, 1988, issued as U.S. Pat. No. 4,897,031 on Jan. 30, 1990; which is a continuation-in-part of U.S. Ser. No. 004,275, filed Jan. 5, 1987, issued as U.S. Pat. No. 4,773,182 on Sep. 27, 1988; which is a continuation of U.S. Ser. No. 613,080, filed May 22, 1984 now abandoned; and which is a continuation-in-part of design application U.S. Ser. No. 367,098, filed Jun. 15, 1989, issued as U.S. Pat. No. D318,030 on Jul. 9, 1991; which is a continuation-in-part of U.S. Ser. No. 283,014, filed Dec. 8, 1988 now abandoned; which is a continuation of U.S. Ser. No. 652,903, filed Sep. 21, 1984, now abandoned; which is a continuation-in-part of U.S. Ser. No. 613,053, filed May 22, 1984, issued as U.S. Pat. No. D293,224 on Dec. 15, 1987; and, U.S. Ser. No. 710,272, filed Jun. 4, 1991, entitled "FLAT PANEL FLOWER POT COVER" still pending; which is a continuation-in-part of U.S. Ser. No. 617,454, filed Nov. 21, 1990; U.S. Ser. No. 411,249, filed Sep. 22, 1989., U.S. Ser. No. 411,247, filed Sep. 22, 1989 still pending; U.S. Ser. No. 411,245, filed Sep. 22, 1989 still pending.

This application is also related to design application entitled "FLOWER POT COVER WITH FINS" filed on an even date herewith.

FIELD OF THE INVENTION

The present invention relates to a flower pot or flower pot cover having fins in the skirt or base or both skirt and base.

BRIEF DESCRIPTION OF THE DRAWINGS

FIG. 1 is a side elevation of a flower pot or flower pot cover constructed in accordance with the present invention.

FIG. 2 is a cross-sectional view taken along the lines 2—2 of FIG. 1. The thickness of the sheet of material is exaggerated for purposes of illustration.

FIG. 3 is a side elevational, partial sectional, partial diagrammatic view of an apparatus constructed in accordance with the present invention. The male mold, the sheet of material, and the female mold are in sectional views for better illustration. The thickness of the sheet of material is exaggerated for purposes of illustration.

FIG. 7 is a vertical cross-sectional view of the male mold of FIG. 3 with the male mold fingers in the retracted position.

FIG. 8 is a vertical cross-sectional view of the male mold of FIG. 3 with the male mold fingers in the extended position.

FIG. 11 is a vertical, partially sectional and partially diagrammatical view of the female mold of FIG. 3.

FIG. 12 is a partial cross-sectional view taken along lines 12—12 of FIG. 11.

FIG. 13 is a partial elevational view of the stationary and traveling blocks of FIG. 12 from the inside of the female mold.

FIG. 14 is a top plan view of another form of male mold excluding the male mold fingers and pneumatic cylinders and constructed in accordance with the present invention.

FIG. 15 is a bottom plan view of the male mold of FIG. 14.

FIG. 16 is a top plan view of another form of female mold constructed in accordance with the present invention.

FIG. 17 is a side elevation of another form of flower pot or flower pot cover constructed in accordance with the present invention.

FIG. 18 a cross-sectional view taken along lines 18-18 of FIG. 17. The thickness of the sheet of material is exaggerated for purposes of illustration.

FIG. 19 is a vertical view, partially sectional and partially diagrammatical, of an apparatus constructed in accordance with the present invention for forming the flower pot or flower pot cover of FIG. 17 from a sheet of material. The thickness of the sheet of material is exaggerated for purposes of illustration.

FIG. 26 is the same view as the view in FIG. 18 of another form of flower pot or flower pot cover constructed in accordance with the present invention.

FIG. 27 is a top plan view of another form of male mold constructed in accordance with the present invention.

FIG. 28 is a top plan view of another form of female mold constructed in accordance with the present invention.

DETAILED DESCRIPTION OF THE PREFERRED EMBODIMENTS

Figure 4:
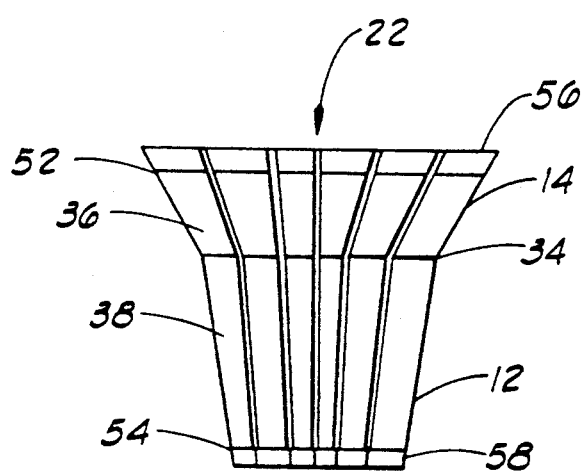
FIG. 4 is a side elevation of the male mold of FIG. 3, excluding the male mold fingers and the pneumatic cylinders.

Referring now to the drawings in general, and to FIGS. 1 and 2 in particular, reference numeral 10 indicates a flower pot or flower pot cover with outwardly extending fins. For simplicity, the term "flower pot cover" is used hereinafter to mean a "flower pot" as well as a "flower pot cover." It will be appreciated that a flower pot has an opening for the insertion of floral and decorative objects and a flower pot cover has an opening for the insertion of a flower pot containing floral and decorative objects.

The flower pot cover 10 has a base 12, which is generally frusto-conical in shape, and a skirt 14 extending angularly upward from the base 12. An opening 16 is formed in the flower pot cover 10 for the insertion of a flower pot with decorative and floral arrangements. A plurality of fins extend outwardly from the outer perimeter of the base 12 and the skirt 14 of the flower pot 10. One of the fins, designated by reference numeral 18, is generally representative of the fins formed in the flower pot cover 10.

FIG. 3 illustrates an apparatus 20 constructed in accordance with the present invention for forming the flower pot cover 10 with outwardly extending fins 18 from a sheet of material 21. It will be appreciated that the thickness of the sheet of material 21 is exaggerated in FIG. 3 for purposes of illustration. The apparatus 20 comprises a male mold 22 and a female mold 24, the female mold 24 having an opening 26 mating with the male mold 22. The male mold 22 includes a pneumatic cylinder 32 or other mechanism for movement of the male mold 22. The pneumatic cylinder 32 is adapted and positioned to move the male mold 22 in a downward direction 33a into a forming position within the female mold 24 and in an upward direction 33b to a storage position at a distance from the female mold 24. The hydraulic cylinder 32 is connected to a support assembly (not shown) and the hydraulic cylinder 32 and the support assembly cooperate to support the male mold 22 at a distance from the female mold 24 in the storage position of the male mold 22.

The male mold 22 comprises of a plurality of male segments. One of the male segments, designated by reference number 34, is generally representative of the male segments forming the male mold 22. Each male segment 34 has a skirt forming surface 36 and a base forming surface 38. The outer periphery of the male skirt forming surfaces 36 and the male base forming surfaces 38 comprise a male forming surface of the male mold 22.

Between each pair of adjacent male segments 34 extends a male finger. One of the fingers, designated by reference number 40, is generally representative of the of fingers of the male mold 22. Each of the male fingers 40 is connected to a pneumatic cylinder 41 for extending the attached male finger 40 to the bottom 42 of the male mold 22 and for retracting the attached male finger 40 to a position where the finger 40 does not protrude radially from the outer periphery of the male segments 34.

The sheet of material 21 has a relatively small thickness, preferably less than about 3 mils. However, depending upon the type of materials selected and the desired effect in the formed flower pot cover 10, the sheet of material may have a thickness in a range from less than about 1.5 mils to about 30 mils. The sheet of material is constructed of a material selected from the group of materials consisting of cellophane, man-made organic polymer films, metallic foil, burlap, fabric or paper or combinations thereof.

The term "man-made organic polymer film" means a man-made resin such as a polypropylene as opposed to naturally occurring resins such as cellophane.

A man-made organic polymer film is relatively strong and not as subject to tearing (substantially non-tearable), as might be the case with paper or foil. The man-made organic polymer film is a substantially linearly linked processed organic polymer film and is a synthetic linear chain organic polymer where the carbon atoms are substantially linearly linked. Such films are synthetic polymers formed or synthesized from monomers. Further, a relatively substantially linearly linked processed organic polymer film is virtually waterproof, a characteristic which may be desirable in many applications such as holding a floral grouping.

Additionally a relatively thin film of substantially linearly linked processed organic polymer does not substantially deteriorate in sunlight. Processed organic polymer films having carbon atoms both linearly linked and cross linked polymer films also may be suitable for use in the present invention, provided such films are substantially flexible and can be made in a sheet-like format for wrapping purposes consistent with the present invention. For example, one man-made organic polymer film is polypropylene film.

In order for the flower pot cover 10 to be shape-sustaining, the sheet of material 21 may be treated to be self-adhering or heat-sealant. A self-adhering material sets folds upon contact with itself and the pressure exerted by the male mold 22 and female mold 24 in the forming process. Application of heat to a heat-sealant material causes folds in the material to be sustained after the forming process.

As shown in FIG. 3, the female mold 24 comprises a plurality of female segments. One of the female segments, designated by reference number 44, is generally representative of the female segments of the female mold 24. The surfaces of the female segments 44 which form the opening 26 of the female mold 24 comprise a female molding surface. The female molding surface is made up of female skirt surfaces and female base surfaces. One of the female skirt surfaces, designated by reference character 46, is generally representative of the plurality of female skirt surfaces. One of the female base surfaces, designated by reference character 48, is generally representative of the plurality of female base surfaces. The female forming surfaces 46 and 48 are sized and shaped to mate with the male forming surfaces of the male mold 22.

Figure 5:
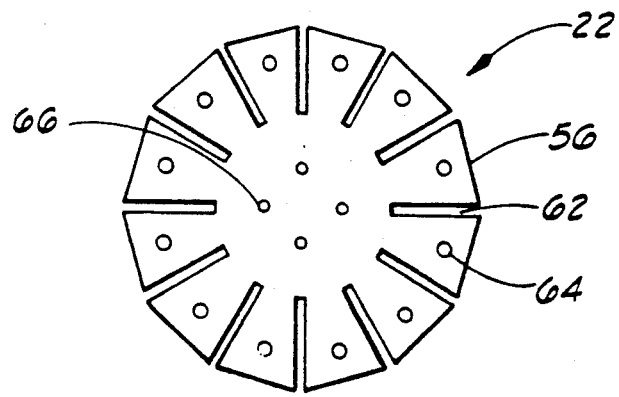
FIG. 5 is a top plan view of the male mold of FIG. 4.
Figure 6:
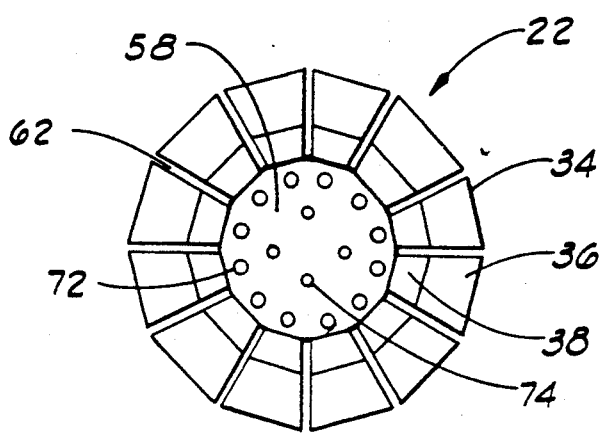
FIG. 6 is a bottom plan view of the male mold of FIG. 4.

The male mold 22 is shown separately, without the fingers 36, in FIGS. 4, 5 and 6. The male mold 22 is sectioned into the male mold segments 34. Each male mold segment 34 is separated from adjacent male mold segments 34 by a space extending from the top 52 to the bottom 54 of each male mold segment 34. The male mold segments 34 are connected together by a top plate 56 and a bottom plate 58. The top 56 and bottom 58 plates are attached to the male mold segments by bolts or other fasteners.

FIG. 5 illustrates the top plate 56 of the male mold 22. The top plate 56 has a multi-sided shape, with a plurality of slots extending from the outer periphery of the plate 56 toward the center of the plate 56. One of the slots is designated by reference numeral 62 and is generally representative of the slots in the plate 56. The slots 62 align with the spaces between the male mold segments 34 and are sized and shaped to allow the fingers 40 to pass therethrough.

Each area of the top plate 56 between the slots 62 has at least one hole 64 for inserting a bolt or other fastener to connect the top plate 56 to the top end 52 of one of the male mold segments 34. A plurality of holes is formed in the inner portion of the top plate 56. One of the inner holes is designated by reference numeral 66 and is generally representative of the inner holes in the top plate 56. The inner holes 66 are used for the attachment of the pneumatic cylinder 32 and for attachment of the top plate 56 to the bottom plate 58 through the center of the male mold 22.

FIG. 6 shows the bottom plate 58 attached to the bottom 54 of the male mold segments 34. Like the top plate 56, the bottom plate 58 is multi-sided. The bottom plate 58, however, has no slots for the passage of the fingers 40. At least one hole extends through an outer portion of the bottom plate 58 into each male mold segment 34 for attaching each male mold segment 34 to the bottom plate 58 by means of a bolt or other fastener. One of the outer holes is designated by reference numeral 72 and is generally representative of the outer holes of the bottom plate 58. A plurality of holes are formed through an inner portion of the bottom plate 58. One of the inner holes is designated by reference numeral 74 and generally represents the inner holes of the bottom plate 58. The inner holes 74 are used to attach the bottom plate 58 to the upper plate 56 through the center of the male mold 22 with bolts or other fasteners.

FIGS. 7 and 8 illustrate the fingers 40 of the male mold 22. One of the fingers 40 of the male mold 22 is mounted in each vertical space between adjacent male mold segments 34 by means of a guide slot 82 in the finger 36 and at least one pin 84 extending horizontally between the adjacent male mold segments 34 and through the guide slot 82. The pneumatic cylinder 41 attached to the upper end of each finger 40 moves the finger 40 between a retracted position shown in FIG. 7 and an extended position shown in FIG. 8. In the retracted position of FIG. 7, each finger 40 is a distance above the bottom plate 58 and does not protrude from the outer periphery of the male mold segments 34. In the extended position of FIG. 8, each finger 40 extends through one of the slots 62 of the upper plate 56 and one of the vertical spaces between the male mold segments 34. When the fingers 40 are extended as illustrated by FIG. 8, each finger 40 reaches the bottom plate 58 and a portion of each finger 40 extends radially outward from the outer periphery of the male mold segments 34.

Figure 9:
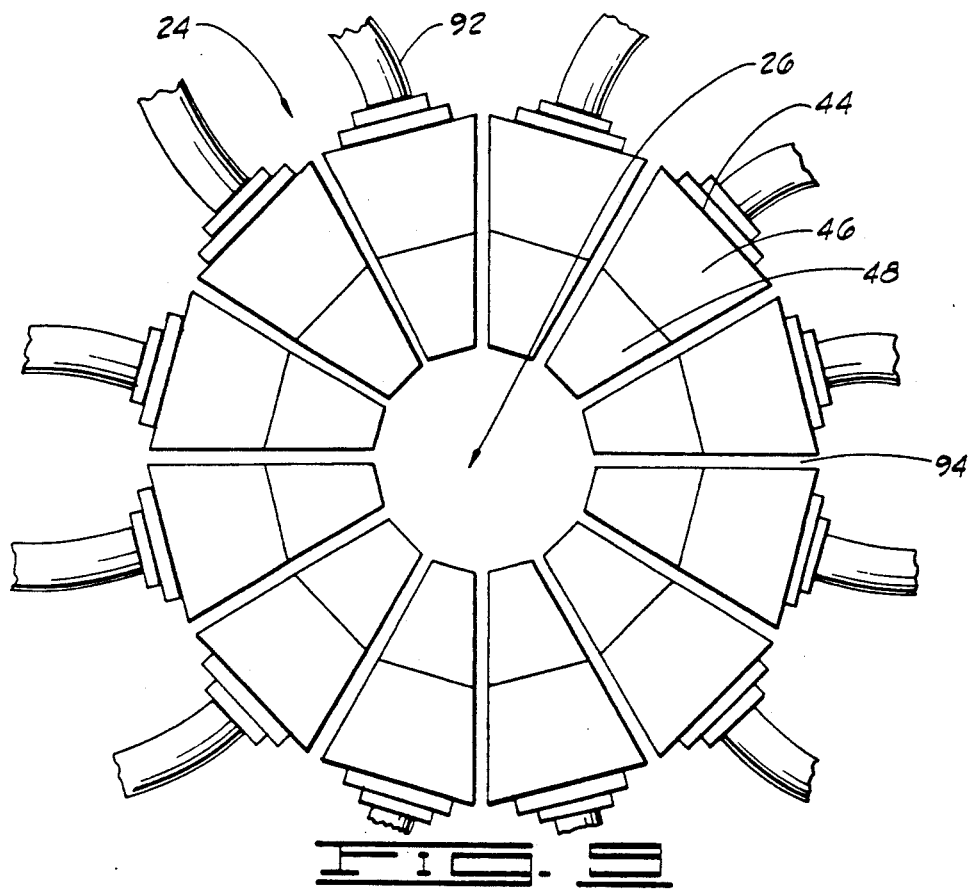
FIG. 9 is a top plan view of the female mold of FIG. 3 with the female segments in the open position.
Figure 10:
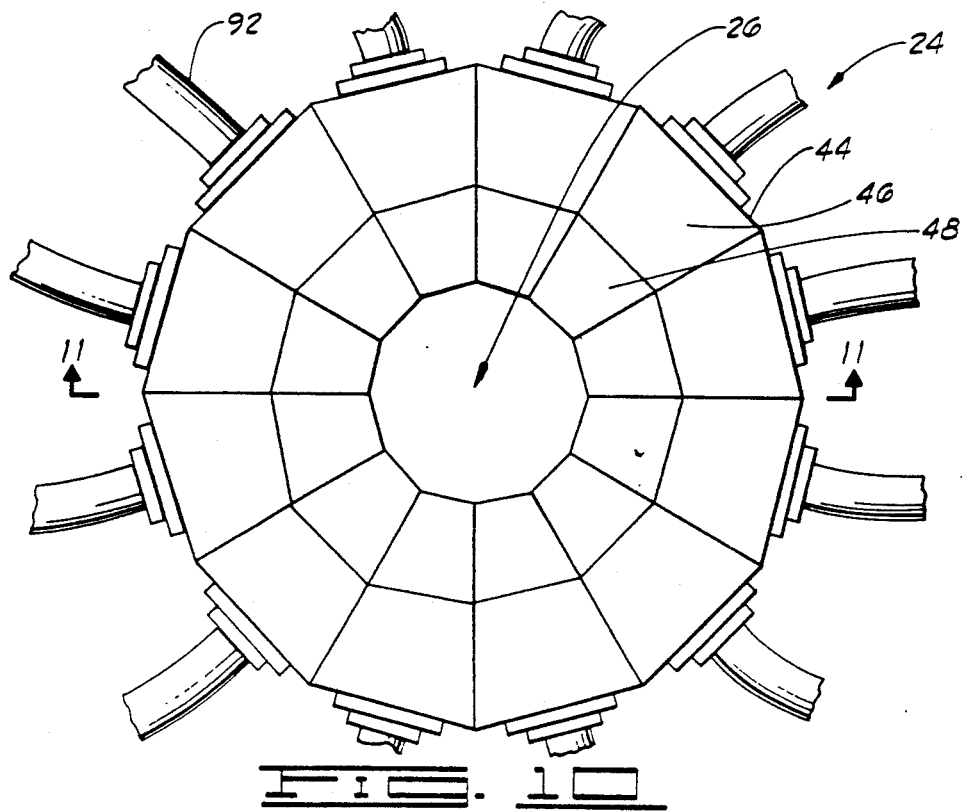
FIG. 10 is a top plan view of the female mold of FIG. 3 with the female segments in the closed position.

FIGS. 9 and 10 illustrate the construction of the female mold segments 44. The female mold segments 44 are arranged to form the multi-sided opening 26. As described hereinabove, each female mold segment 44 comprises the female skirt forming surfaces 46 and the female base forming surfaces 48. Together, the female skirt forming surfaces 46 and the female base forming surfaces 48 make up the female forming surfaces.

As shown in FIGS. 9 and 10, a pneumatic cylinder is attached to each female mold segment 44. One of the pneumatic cylinders is designated by reference numeral 92 and is generally representative of the pneumatic cylinders of the female mold 24. Each pneumatic cylinder 92 is adapted to move the attached female mold segment 44 between an open position shown in FIG. 9 and a closed position shown in FIG. 10. In the open position of FIG. 9, the female mold segments 44 are separated by spaces. One of the spaces is designated by reference numeral 94 and is generally representative of the spaces between the female mold segments 44 when in the open position. In the closed position of FIG. 10, the female mold segments 44 are moved inward by the pneumatic cylinders 92 and the female mold segments 44 press against each other.

FIG. 11 illustrates the female mold 24 installed in a platform 102. The platform 102 comprises an upper work surface 104 supported by a plurality of sides 106 and a bottom 108. The upper work surface 104 is a flat, level area surrounding the upper end of the female mold 24. The upper surface 104 is supported by the sides 106 and the bottom 108 of the platform 102.

A plurality of vacuum lines extend from the outer periphery of each female mold segment 44 to the surface of the female opening 26. One of the vacuum lines is designated by reference numeral 122 and is generally representative of the vacuum lines of the female mold 24. Each vacuum line 122 opens at the surface of the female opening 26 and is connected to common duct 124 and vacuum supply hose 126. A vacuum source (not shown) provides an air suction through the hoses 126, the ducts 124 and the lines 122 to create a vacuum at the surface of the female opening 26.

A plurality of cartridge type heating elements may be connected to the female segments 44. One of the heating elements is designated by reference number 128 and is generally representative of the heating elements of the female mold 24. The heating elements 128 are positioned about the female segments and connected to an electrical power supply (not shown) for heating the female forming surface to a predetermined temperature level for forming the flower pot cover 10. The sheet of material 21 may be a heat-sealable substance in order for the heat to give the shape of the flower pot cover 10 added permanence.

Continuing to refer to FIG. 11, the bottom of each female mold segment 44 is attached to a corresponding traveling block 132 and slides on a portion of two stationary blocks 134 positioned on each side of the traveling block 132. One of the pneumatic cylinders 92 is connected to each traveling block 132 and moves the traveling block 132 and the attached female mold segment 44 between the open position and the closed position. FIG. 12 shows the attachment of the pneumatic cylinder 92 to the traveling block 132.

The traveling blocks 132, stationary blocks 134 and female mold 24 are supported by the bottom 108 of the platform 102. As best shown in FIG. 13, a plurality bolts or fasteners 136 extend downward through each stationary block 134 and into the platform bottom 108 to secure each stationary block 134. Each bolt 136 is countersunk to make the upper surface of each stationary block a smooth area on which the female segments 44 can slide. A plurality of bolts or fasteners 138 extend upward through each traveling block 132 and into one of the female mold segments 44. Each bolt 138 is countersunk to make the bottom surface of each traveling block smooth for sliding on the bottom 108 of the platform 102. Each side of each traveling block 132 has an L-shaped shoulder 142 which mates with an L-shaped shoulder 144 of the adjacent stationary block 134. With this construction of the stationary blocks 134 and traveling blocks 132, the stationary blocks 134 define a path of travel for the traveling blocks 132 and restrict the traveling blocks 132 to the travel path.

In operation, the male mold 22 is moved to the storage position with the fingers 40 retracted. The female segments 44 of the female mold 24 are moved to the open position with the vacuum off. The sheet of material 21 is then placed over the opening 26 of the female mold 24.

The male mold 22 is moved into the opening 26 of the female mold 24 with the sheet of material 21 between the male mold 22 and the female mold 24. In the forming position, each male base forming surface 38 aligns with one of the female base forming surfaces 48 and each male skirt forming surface 36 aligns with one the female skirt forming surfaces 46. Before the male forming surfaces press the sheet of material against the female forming surfaces, the fingers 40 of the male mold 22 are extended to push folds in the sheet of material 21 between the open female segments 44. The vacuum of the female mold 24 is then activated to hold the folds and sheet of material 21 in place during the forming process. Once the vacuum is effectively holding the sheet of material 21, the fingers 40 of the male mold 22 are retracted leaving the folds in the sheet of material 21 in the spaces between the female segments 44.

At this time, the female segments 44 are closed on the folds in the sheet of material 21 to form outwardly extending fins in the sheet of material 21. At the same time, the male mold 22 is moved fully into the female opening 26, pressing the sheet of the material 21 between the male forming surfaces and the female forming surfaces to form the sheet of material 21 into the shape of the flower pot cover 10. If the sheet of material 21 is a heat-sealable substance, the heat from the cartridge heating elements 128 of the female mold 24 heat-seals the sheet of material 21 into the shape of the flower pot cover 10 with outwardly extending fins.

After the forming process, the male mold 22 is returned the storage position at a distance from the female mold 24. The vacuum of the female mold 24 is turned off and the female segments 44 are moved to the open position. The completed flower pot cover 10 with outwardly extending fins is removed from the opening 26 of the female mold 24, and the process begins anew with another sheet of material 21.

FIGS. 14, 15 and 16 illustrate another form of male mold 22A and female mold 24A constructed in accordance with the present invention. As FIG. 14 shows, the male mold 22A and the top plate 56A have an outer periphery which is circular rather than multi-sided. As best illustrated by FIG. 15, the male skirt forming surfaces 36A and the male base forming surfaces 38A of the male segments 34A are curved. As FIG. 16 shows, the female mold 24A has the skirt forming surfaces 46A and base forming surfaces 48A of the female opening 26 which are also curved and mate with the curved forming surfaces of the male mold 22A. The male mold 22A and female mold 24A cooperate to produce the flower pot cover 10 with outward fins and a circular shape, rather than the multi-sided shape with flat sides achieved with the male mold 22 and the female mold 24.

Embodiment of FIGS. 17 through 28

FIGS. 17 and 18 illustrate a flower pot cover 10B with inwardly extending fins constructed in accordance with the present invention. The flower pot cover 10B has a base 12B, which is generally frusto-conical in shape, and a skirt 14B extending angularly upward from the base 12B. An opening 16 is formed in the flower pot cover 10B for the insertion of decorative and floral arrangements. A plurality of fins extend radially toward the center of opening 10B from the inner periphery of the base 12B and skirt 14B. One of the inward fins is designated by reference numeral 18B in FIG. 18 and is generally representative of the inward fins of the flower pot cover 10B. The thickness of the sheet of material is exaggerated in FIG. 18 for purposes of illustration.

FIG. 19 illustrates an apparatus constructed in accordance with the present invention for forming the flower pot cover 10B with inwardly extending fins. The apparatus 20B comprises the male mold 22B and the female mold 24B having the opening 26 mating with the male mold 22B. The outer periphery of the male mold 22B is essentially a male forming surface generally corresponding to the size and shape of the flower pot cover 10B to be formed. The male mold 22B includes the pneumatic cylinder 32 or other mechanism for moving the male mold 22B into and out of the opening 26 of the female mold 24B. As shown in FIG. 18, the pneumatic cylinder 32 is attached to a housing 160, which in turn is attached to the upper end of the male mold 22B.

The male mold 22B is sectioned into male segments 34B. The male segments 34B are movable between a normally open position wherein the male segments 34B are separated by spaces and a closed position wherein the male segments 34B are compressed together. The male segments 34B are moved together to press folds in the sheet of material 21 into inwardly extending fins.

The female mold 24B is sectioned into female segments 44B. A female mold finger is positioned within each vertical space between female segments 44B. One of the female mold fingers is designated by reference numeral 152 and is generally representative of the fingers of the female mold 24B. The female mold fingers 152 are movable between a retracted position wherein the fingers 152 are removed from the opening 26 of the female mold 24B and an extended position wherein the fingers 152 extend a distance into the opening 26 of the female mold 24B. with the male segments 34B in the open position and the male mold 22B disposed in the opening 26 of the female mold 24B, the fingers 152 of the female mold 24B can be extended through the vertical spaces between the female segments 44B and into the vertical spaces between the male segments 34B.

Figure 20:
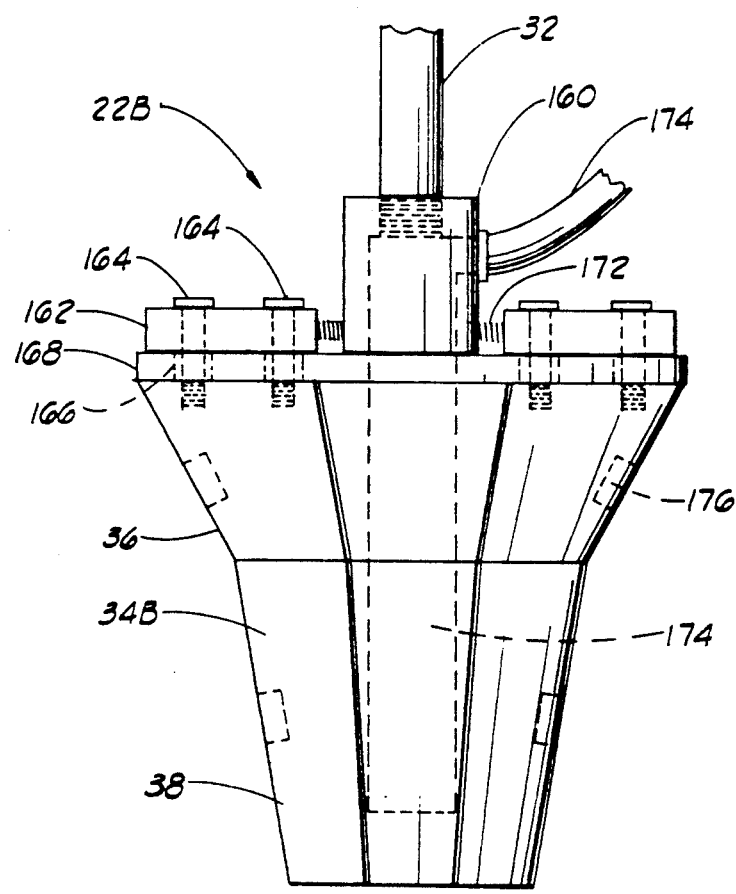
FIG. 20 is a side elevation of the male mold of FIG. 19.
Figure 21:
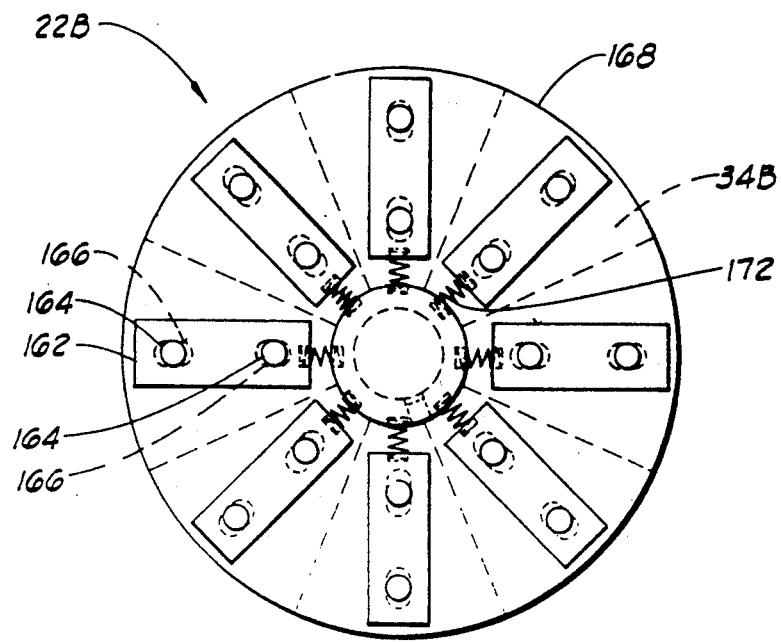
FIG. 21 is a top plan view of the male mold of FIG. 19.

FIGS. 20 and 21 illustrate the construction of the male mold 22B. Each male segment 34B of the male mold 22B is rigidly connected to a sliding block 162 by at least one bolt 164 extending through a guide slot 166 formed through a plate 168. The plate 168 is generally circular in shape and is essentially the same size as the circle formed by the upper surface of the male segments 34B. Each guide slot 166 is elongated to allow the respective bolt 164 to travel from end to end of the guide slot 166. When the bolt 164 is at the outer end of the guide slot 166, the attached male segment 34B is in the open position, separated from the adjacent male segments 34B by vertical spaces. When the bolt 164 is at the inner end of the guide slot 166, the attached male segment 34B is pressed against the adjacent male segments 34B in the closed position. Each sliding block 162 slides upon the upper surface of the plate 168 as the attached male segment 34B moves between the open and closed positions.

As best shown in FIG. 21, a spring 172 is positioned between the housing 160 and the inner end of each sliding block 162. Each spring 172 provides pressure to push the bolts 164 of the attached sliding block 162 to the outer ends of the guide slots 166. The springs 172 act to bias the male segments 34B in the open position.

As FIG. 20 illustrates, a vacuum line 174 is connected to the housing 160 and runs down a central portion of the male mold 22B. The vacuum line 174 is attached to a vacuum supply (not shown) and opens into the central portion of the male mold 22B to provide an air suction toward the center of the male mold 22B.

Also shown in FIG. 20 is a plurality of cartridge type heating elements which may be connected to the male mold 22B. One of the heating elements is designated by reference numeral 176 and is generally representative of the heating elements of the male mold 22B. Each of the heating elements 176 is disposed in a cylinder in an inner portion of the male mold 22B and the heating elements 176 are positioned about the male mold 22B to heat the male mold surface to a predetermined temperature level during the operation of the apparatus 20B. Each of the heating elements 176 is connected to an electrical power supply (not shown).

Figure 22:
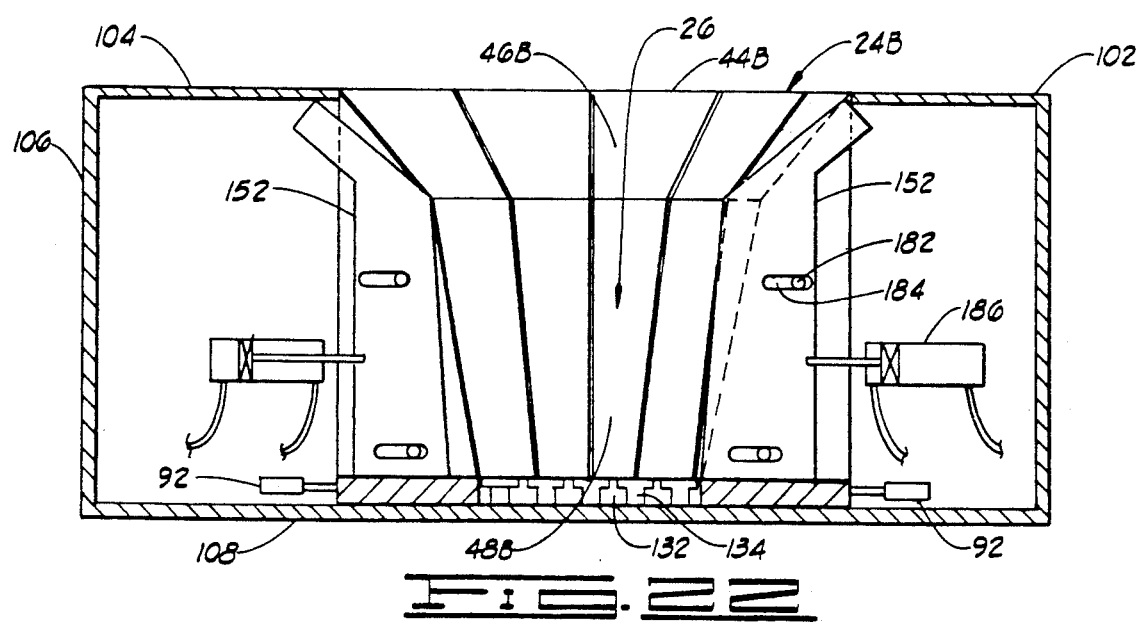
FIG. 22 is a vertical cross-sectional view of the female mold and platform of FIG. 19.
Figure 23:
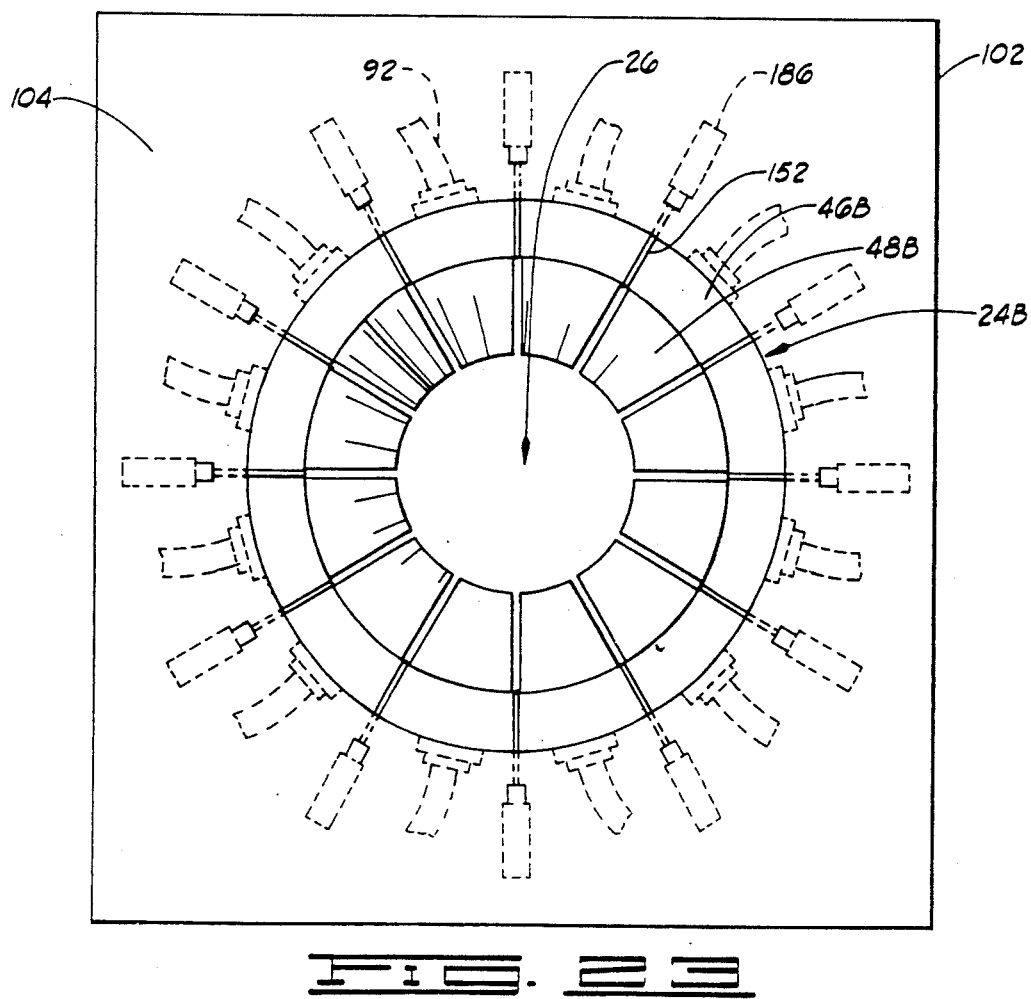
FIG. 23 is a top plan view of the female mold and platform of FIG. 22.

FIG. 22 shows the female mold 24B installed in the platform 102. The female mold 24B is identical to the female mold 24 except for three modifications. First, the female mold 24B has no vacuum lines. Second, the female mold 24B has no cartridge type heating elements. Third, the female mold 24B has the plurality of fingers 152 which are adapted to move in the spaces between the female segments 44B.

Each female mold finger 152 is generally a flat plate, shaped to introduce an inward fin into the skirt and base portions of the female opening 26 when extended into the female opening 26. Each female mold finger 152 is mounted by means of a plurality of pins and guide slots to be extendable into the vertical space between each pair of adjacent female segments 44B. One of the pins is designated by reference numeral 182 and is generally representative of the pins extending between adjacent female segments 44B. One of the guide slots is indicated by reference number 184 and is generally representative of the guide slots formed in the female mold fingers 152. A pneumatic cylinder 186 is attached to each female mold finger 152 for moving the finger 152 between a retracted position and an extended position. In the retracted position, each female mold finger 152 is entirely outside the female opening 26. When extended, a portion of each finger 152 protrudes into the female opening 26 in the fashion of a fin directed toward the center of the female opening 26.

In operation, the male mold 22B is first positioned in the storage position, spaced at a distance from the female mold 24B. The sheet of material 21 is placed between the male mold 22B and the female mold 24B and over the opening 26 of the female mold 24B. Both the male mold segments 34B and the female mold segments 44B are moved to the open position. The female mold fingers 152 are placed in the retracted position.

The male mold 22B is moved into the opening 26 of the female mold 24B, with the sheet of material 21 between the male mold 22B and the female mold 24B. It will be appreciated that, as the male mold 22B is pushed into the opening 26 of the female mold 24B, the vertical spaces between the male mold segments 34B align with the vertical spaces between the female mold segments 44B.

Figure 24:
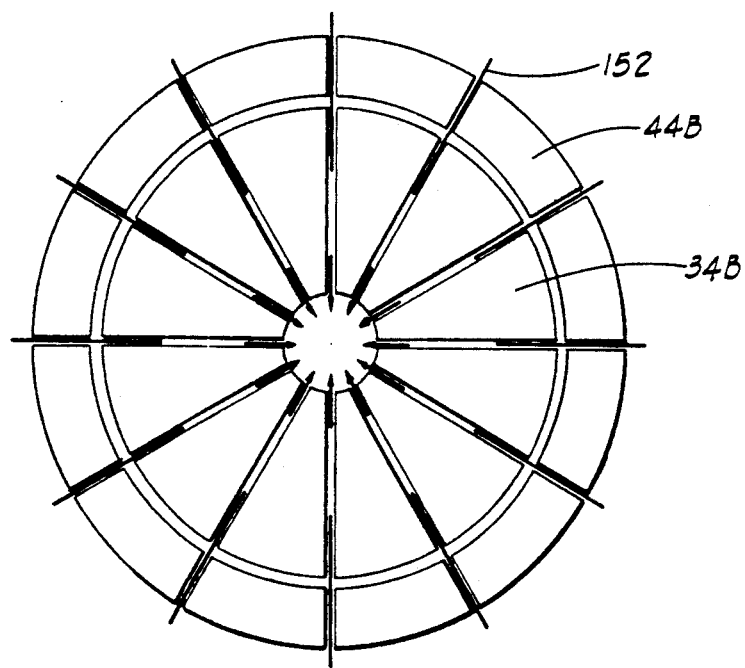
FIG. 24 a horizontal, sectional and diagrammatical view of the male and female molds of FIG. 19 with the male and female segments in the open position and the female mold fingers extended.
Figure 25:
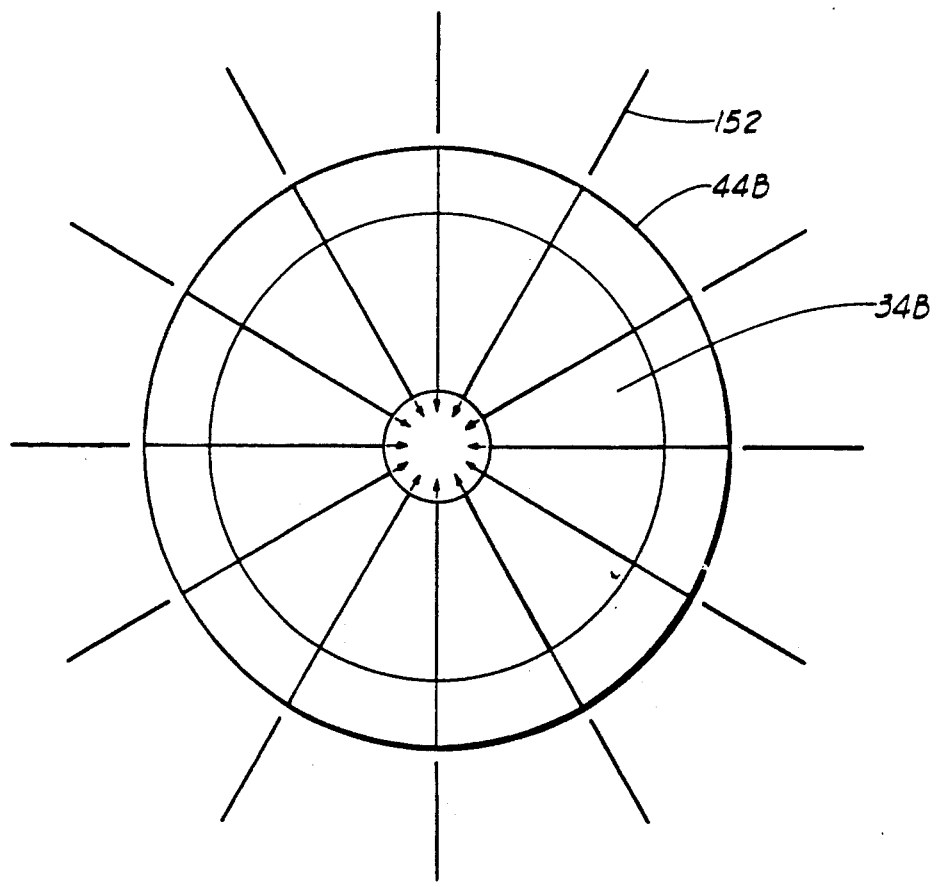
FIG. 25 is the view of FIG. 24 with the male and female segments in the closed position and the female mold fingers retracted.

FIGS. 24 and 25 diagrammatically illustrate how the male mold 22B and the female mold 24B cooperate to form inward fins in the sheet of material 21. As shown in FIG. 24, the female mold fingers 152 are extended through the spaces between the female mold segments 44B to protrude into the spaces between the male mold segments 34B. The protrusion of the female mold fingers 152 in between the male mold segments 44B forces a fold in the sheet of material 21 to be formed between each pair of adjacent male segments 44B. At this time the vacuum of the male mold 22B is activated to draw the folds in the sheet of material 21 toward the center of the male mold 22B, as indicated by the arrows in FIGS. 24 and 25.

Once the folds are in place and the vacuum of the male mold 22B is on, the female mold fingers 152 are moved back to the retracted position. The vacuum of the male mold 22B holds the folds between the male segments 34B. The pneumatic cylinders 92 are then activated to close the female segments 44B. As illustrated by FIG. 25, the female segments 44B close together, push against the male segments 34B to overcome the bias of the springs of the male mold 22B, and cause the male segments 34B to close together also. When the male segments 34B close together, each fold in the sheet of material 21 between the male segments 34B is pressed. If the sheet of material 21 is self-adhering, the sides of each fold adhere to each other and the fins are formed. If the sheet of material 21 is heat-sealant, the heat elements of the male mold 22B supply heat to seal the folds to form fins. At the same time that the fins are being formed, the male mold 22B is pushed fully into the opening 26 of the female mold 24B to form the sheet of material 21 into the shape of the flower pot cover 10B.

After the fins are formed, the pneumatic cylinders 92 move the female segments 44B back to the open position and the springs 172, no longer compressed by the female segments 44B, return the male segments 34B to the open position The male mold 22B is withdrawn from the female opening 26 and returned to the storage position. The vacuum of the male mold 22B is turned off and the flower pot cover 10 with inward fins is removed from the male mold 22B. The apparatus 20B is then ready to repeat the process with another sheet of material 21.

FIGS. 26, 27 and 28 shown another form of flower pot cover 10C, male mold 22C and female mold 24C constructed in accordance with the present invention. As FIG. 26 shows, the flower pot cover 10C is exactly like the flower pot cover 10B, except that the material between the fins 18C is formed to be flat rather than curved. FIGS. 27 and 28 illustrate the male mold 22C and the female mold 24C utilized to form the flat-sided flower pot cover with inward fins 10C. As shown in FIG. 27, the male mold 22C is identical to the male mold 22B, except that the male mold 22C has flat sides making up the skirt and base forming surfaces of the male mold 22C. As illustrated by FIG. 28, the female mold 24C is exactly like the female mold 24B, except that the skirt and base forming surfaces of the female mold 24C are straight and flat rather than curved.

Changes may be made in the combinations, operations and arrangements of the various parts and elements described herein or in the steps or sequence of steps of the methods described herein without departing from the spirit and scope of the invention as defined in the following claims.

What is claimed is:

1. A method of forming a flower pot or flower pot cover with outwardly extending fins, the steps of the method comprising:

placing a sheet of material between a male mold and a female mold, the male mold having a male molding surface and a plurality of fingers extendible from the male molding surface, and the female mold having a plurality of female segments and an opening defining a female molding surface;

moving at least one of the male mold and the female mold into a forming position wherein the male mold is disposed in the opening of the female mold with at least a portion of the sheet of material being disposed generally between the male molding surface and the female molding surface;

moving the female segments to create fin-forming spaces between the female segments;

extending each finger of the male mold into a corresponding one of the fin-forming spaced to push a fold in the sheet of material into the corresponding fin-forming space;

withdrawing each finger of the male mole from the corresponding fin-forming space; and moving the female segments together to press each fold of the sheet of material between the female segments to form a plurality of outwardly extending fins in the sheet of material.

2. The method of claim 1 further comprising the steps of:

providing the male mold with a vacuum;
moving the female segments of the female mold apart;
activating the vacuum of the male mold; and
moving the male mold a distance form the opening of the female mold with a sheet of material formed into the shape of a flower pot or flower pot cover held to the male mold by the vacuum of the male mold.

3. A method of forming a flower pot or flower pot cover with outwardly extending fins, the steps of the method comprising:

placing a sheet of material between a male mold and a female mold, the male mold having a male molding surface and a plurality of fingers extendible from the male molding surface, and the female mold having a plurality of female segments, an opening defining a female molding surface and a vacuum for holding the sheet of material against the female molding surface;

moving at least one of the male mold and the female mold into a forming position wherein the male mold is disposed in the opening of the female mold with at least a portion of the sheet of material being disposed generally between the male molding surface and the female molding surface;

moving the female segments to create fin-forming spaces between the female segments;

extending each finger of the male mold into a corresponding one of the fin-forming spaces to push a fold in the sheet of material into the corresponding fin-forming space;

activating the vacuum of the female mold to hold the sheet of material in place in the female mold;

withdrawing each finger of the male mold from the corresponding fin-forming space; and moving the female segments together to press each fold of the sheet of material between the female segments to form a plurality of outwardly extending fins in the sheet of material.

4. The method of claim 3 further comprising the step of applying heat to the female mold.

5. The method of claim 3 further comprising the step of removing the sheet of material from the opening of the female mold after the sheet of material is formed into the shape of a flower pot or flower pot cover with outwardly extending fins.

6. The method of claim 5 wherein the step of removing the sheet of material from the opening of the female mold further comprises:

providing the male mold with a vacuum;
moving the female segments of the female mold apart;
deactivating the vacuum of the female mold;
activating the vacuum of the male mold; and
moving the male mold a distance from the opening of the female mold with the sheet of material formed into the shape of a flower pot or flower pot cover held to the male mold by the vacuum of the male mold.

7. An apparatus for forming a sheet of material into a flower pot or flower pot cover having outwardly extending fins, the apparatus comprising:

a female mold having an upper end, a lower end, an outer periphery, an opening extending through the upper end and into the female mold to form a female molding surface, the female mold comprising a plurality of female segments;

a male mold having an upper end, a lower end, an outer periphery and a male molding surface;

means for moving the male mold between a resting position wherein the male mold is spaced a distance from the female mold and a forming position wherein the male mold is disposed in the opening of the female mold;

means for moving the female segments between an open position wherein the female segments are separated by vertical fin-forming spaces and a closed position wherein the female segments are compressed together; and a plurality of fingers extending from the outer periphery of the male mold, each finger corresponding to one of the fin-forming spaces of the female mold;

wherein each finger of the male mold aligns with the corresponding fin-forming space and pushes a fold of the sheet of material into the corresponding fin-forming space of the female mold as the male mold is moved into the forming position with the female mold and wherein the female segments are moved to the closed position to press each fold between two of the female segments and form outwardly extending fins in the sheet of material.

8. The apparatus of claim 7 wherein the means for moving the female segments comprises:

a plurality of traveling blocks, each traveling block being attached to a corresponding one of the female segments; and means for moving the traveling blocks back and forth between a position wherein the female segments are in the open position and a position wherein the female segments are in the closed position.

9. The apparatus of claim 8 wherein the means for moving the female segments further comprises:

a plurality of stationary blocks, the stationary blocks being positioned to alternate with the positions of the traveling blocks;

wherein each female segment is supported upon at least one of the stationary blocks to slide between the open and closed positions.

10. The apparatus of claim 8 wherein the outer periphery of the male mold is circular in shape and the opening of the female mold is sized and shaped to matingly receive the male mold.

11. The apparatus of claim 8 wherein the outer periphery of the male mold is in the shape of a plurality of straight sides and the opening of the female mold is sized and shaped to matingly receive the male mold.

12. The apparatus of claim 7 wherein the means for forming fins in the sheet of material further comprises:
means for moving the fingers of the male mold back and forth between a withdrawn position wherein the fingers are located a distance from the outer periphery of the male mold and a fin-forming position wherein the fingers extend outwardly from the outer periphery of the male mold.

13. The apparatus of claim 7 wherein the male mold and the opening of the female mold are generally frusto-conical in shape.

14. The apparatus of claim 7 further comprising:
means for releasably holding the sheet of material as the male mold moves into the forming position with the female mold.

15. The apparatus of claim 14 wherein the means for releasably holding the sheet of material is further defined as a plurality of vacuum lines extending through the female segments and opening to the female molding surface to draw the sheet of material to the female molding surface.

16. The apparatus of claim 7 wherein the sheet of material is cohesive to sustain the sheet of material in the shape of a flower pot or flower pot cover with outwardly extending fins by enabling portions of the sheet of material in contact with one another to adhere to one another.

17. The apparatus of claim 7 further comprising:
means for supplying heat to the folds in the sheet of material;
wherein the sheet of material is heat-sealable and wherein the heat and the pressing of the folds in the sheet of material between the female segments cooperate to seal the folds and form outwardly extending fins in the sheet of material.

18. The apparatus of claim 7 wherein the male mold further comprises:
means for creating a vacuum to draw the sheet of material to the male mold and take the sheet of material out of the opening of the female mold with the male mold when the male mold is moved from the forming position to the resting position.

* * * * *

UNITED STATES PATENT AND TRADEMARK OFFICE
CERTIFICATE OF CORRECTION

PATENT NO. : 5,221,248
DATED : June 22, 1993
INVENTOR(S) : Weder, et. al.

It is certified that error appears in the above-indentified patent and that said Letters Patent is hereby corrected as shown below:

Title page, item [63], Related U.S. Data, line 17, start new paragraph with Ser. No. 710,722--.
Column 5, line 33, after finger, delete "36" and substitute therefore--40--.
Column 11, line 12, after finforming, delete "spaced" and substitute therefore --spaces--.
Column 11, line 15, after male, delete "mole" and substitute therefore --mold--.
Title page, item [75], inventors: delete "Strater" and substitute therefore --Straeter--.
Title page, item [63], Related U.S. Data, line 10, after --doned, delete "," and insert --; and--
Title page, item [63], Related U.S. data, line 16, after Des. 293,224, delete "which is a continuation-in-part of " and substitute therefore --; and--.
Column 11, line 26, after distance, delete "form" and substitute therefore --from--.
Column 11, line 27, after with, delete "a" and substitute therefore --the--.

Signed and Sealed this

First Day of November, 1994

Attest:

BRUCE LEHMAN

*Attesting Officer*       *Commissioner of Patents and Trademarks*

UNITED STATES PATENT AND TRADEMARK OFFICE
CERTIFICATE OF CORRECTION

PATENT NO. : 5,221,248
DATED : June 22, 1993
INVENTOR(S) : Weder et al.

It is certified that error appears in the above-identified patent and that said Letters Patent is hereby corrected as shown below:

Cover page, under Related U.S. Application Data, [63], line 4, please delete "which is", and substitute therefore --and said application 422,653 is also--.

Cover page, under Related U.S. Application Data, [63], line 5, please delete "which is", and substitute therefore --and said application 422,653 is also--.

Cover page, under Related U.S. Application Data, [63], line 7, please delete "continuation-in-part", and substitute therefore --continuation--.

Cover page, under Related U.S. Application Data, [63], line 10, please delete "which is", and substitute therefore --and said application 422,563 is also--.

Cover page, under Related U.S. Application Data, [63], line 16, before "Ser.", please insert --said application 805,419 is also a continuation-in-part of--.

Cover page, under Related U.S. Application Data, [63], line 19, please delete "which is", and substitute therefore --and said application 710,272 is also--.

UNITED STATES PATENT AND TRADEMARK OFFICE
CERTIFICATE OF CORRECTION

PATENT NO. : 5,221,248

DATED : June 22, 1993

INVENTOR(S) : Weder et al.

It is certified that error appears in the above-identified patent and that said Letters Patent is hereby corrected as shown below:

Cover page, under Related U.S. Application Data, [63], line 20, please delete "which is", and substitute therefore --and said application 710,272 is also--.

Cover page, under Related U.S. Application Data, [63], line 21, please delete "which is", and substitute therefore --and said application 710,272 is also--.

Column 1, line 9-11, please delete ""FLOWER POT OR FLOWER POT COVER WITH CONTROLLED PLEATS;"", and substitute therefore --"APPARATUS FOR MAKING A FLOWER POT OR FLOWER POT COVER WITH CONTROLLED PLEATS"--.

Column 1, line 11, after "5,073,161", please insert --, issued on Dec. 17, 1991--.

Column 1, line 14, please delete "which is", and substitute therefore --and said application 422,653 is also--.

Column 1, line 16, after "5,111,613", please insert --, issued on May 12, 1992--.

Column 1, line 16, please delete "which is", and substitute therefore --and said application 422,653 is also--.

UNITED STATES PATENT AND TRADEMARK OFFICE
CERTIFICATE OF CORRECTION

PATENT NO. : 5,221,248
DATED : June 22, 1993
INVENTOR(S) : Weder et al.

It is certified that error appears in the above-identified patent and that said Letters Patent is hereby corrected as shown below:

Column 1, lines 18-19, please delete "continuation-in-part", and substitute therefore --continuation--.

Column 1, line 22, please delete "which is", and substitute therefore --said application 422,653 is also--.

Column 1, line 30, after "and,", please insert --said application 805,419 is also a continuation-in-part of--.

Column 1, line 32, please delete "FLAT PANEL".

Column 1, line 34, after "1990", please insert --now abandoned--.

Column 1, line 35, after "1989", please insert --still pending--.

Signed and Sealed this

Fourteenth Day of February, 1995

*Attest:*

BRUCE LEHMAN

*Attesting Officer*  *Commissioner of Patents and Trademarks*